C. H. SCHUBEUS.
Shearing Metal.
No. 64,583. Patented May 7, 1867.
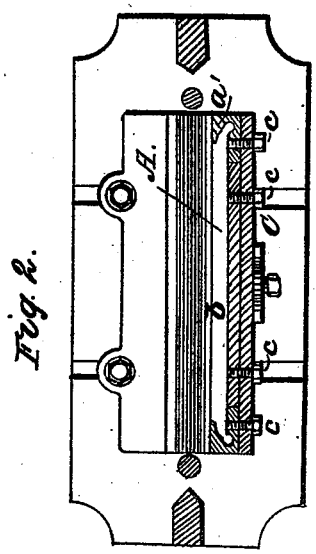
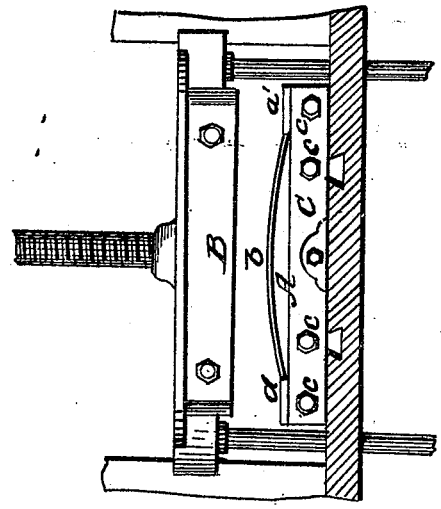

United States Patent Office.

CHARLES H. SCHUBEUS, OF NEWARK, NEW JERSEY, ASSIGNOR TO LAGOUITZ AND ISADORE LEHMAN, OF THE SAME PLACE.

Letters Patent No. 64,583, dated May 7, 1867.

IMPROVED MACHINE FOR CUTTING SHEET METAL.

The Schedule referred to in these Letters Patent and making part of the same.

TO ALL WHOM IT MAY CONCERN:

Be it known that I, CHARLES H. SCHUBEUS, of Newark, in the county of Essex, and State of New Jersey, have invented a new and useful Improvement in Tools for Cutting Metal; and I do hereby declare that the following is a full, clear, and exact description thereof, which will enable those skilled in the art to make and use the same, reference being had to the accompanying drawing, forming a part of this specification, in which—

Figure 1 represents a front elevation of this invention.

Figure 2 is a horizontal section of the cutting die.

Similar letters of reference in both views indicate corresponding parts.

This invention relates to a tool which is intended particularly for cutting sheet metal or hoop iron in the proper form or shape for satchel-frames, travelling-bag frames, and other articles of a similar nature. The invention consists in constructing the die or female part of the cutting tool (and, if desired, also the knife or male part) out of three or more parts, in such a manner that by changing the middle piece (or pieces) for such of greater or less length, the length of the blank to be cut can be varied, and the same end pieces can be used for cutting blanks of every desirable length. The die is made arched or convex, so that the tool begins to cut from the centre, and the sheet metal or other material, while being cut, has a tendency to crowd the die towards the centre, and consequently the several parts of said die are prevented from being forced apart.

A represents the female part or die of my cutting tool, and B the male part or knife. For cutting out blanks for satchel-frames, or other articles of a similar nature, where a number of pieces of different lengths are required to make up a set, the most difficult parts to be formed, and those requiring the largest quantity of steel, are the ends, which are rounded and of the proper shape to form the hinge-joints of the frames, while the intervening rectilinear part, which simply serves to cut the metal, is easily made and requires a comparatively small quantity of steel. For this reason it is desirable that the same end pieces can be used for cutting out blanks of different length. This object is obtained by making the die in three (or more) parts $a\ a'\ b$, the parts $a\ a'$ being the end pieces, and the part $b$ the intervening rectilinear piece. These parts are secured to the tool-holder C by means of screws $c$, or in any other suitable manner, and if the die A is in position the ends of the middle piece $b$ come close up to the ends of the outer or end pieces $a\ a'$, as clearly shown in fig. 1 of the drawing, and the whole die acts as if made out of one solid piece. When it is desired to cut a blank of greater or less length, the middle piece $b$ is removed and replaced by one of the desired length, and after the die has been readjusted and the knife changed, the operation of cutting is continued as before, with the same end pieces $a\ a'$. If desired, the knife B may also be made in three parts, so that the same end pieces can be used for blanks of different length, and the cost of a set of dies and knives for cutting the various sizes of satchel-frames, or other similar articles, is materially reduced. The die A is made arched or convex, as clearly shown in fig. 1, so that it begins to act on the material to be cut from the centre and by the action of said material while being cut the several parts of the die are prevented from spreading, since by reason of the arched shape of the tool the material during the operation of cutting has a tendency to crowd the several parts of the die towards the centre, instead of forcing them away from said centre and from each other.

What I claim, and desire to secure by Letters Patent, is—

The arrangement of the parts $a\ a'\ b$, formed as shown, and secured to the tool-holder C, in combination with the knife B, constructed and operating substantially as and for the purpose described.

CHARLES H. SCHUBEUS.

Witnesses:
OTTO GSANTNER,
E. P. HIGGINS.